Sept. 30, 1958         B. I. CASSIN         2,854,281
SAFETY SHIELD FOR AUTOMOBILES
Filed Nov. 14, 1955         2 Sheets-Sheet 1
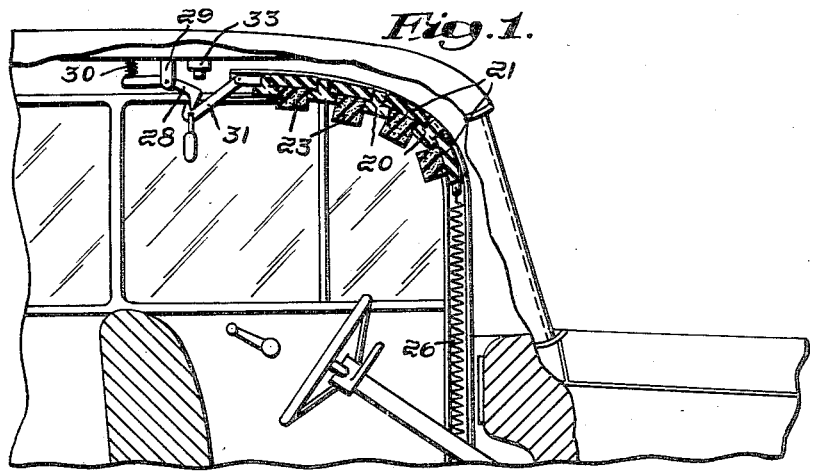
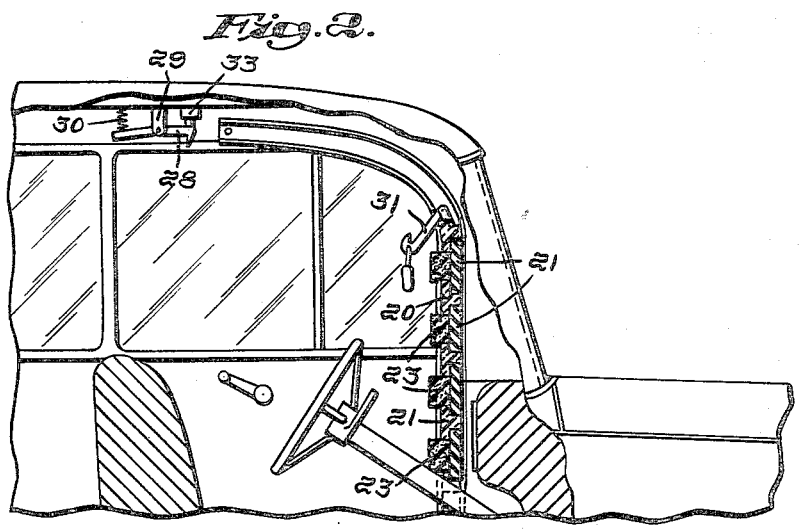
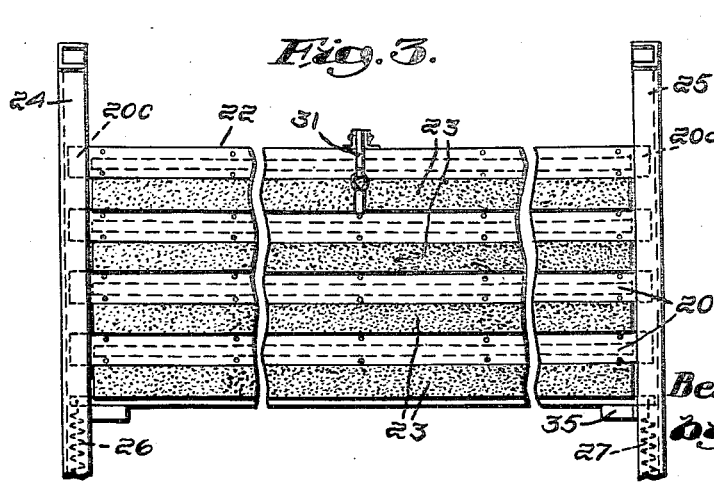
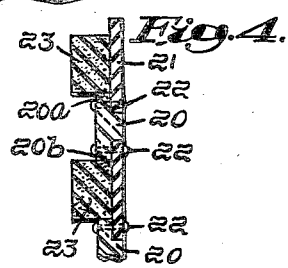
Inventor:
Benjamin I. Cassin,
by Arthur D. Thomson
Attorney Sept. 30, 1958  B. I. CASSIN  2,854,281
SAFETY SHIELD FOR AUTOMOBILES
Filed Nov. 14, 1955  2 Sheets-Sheet 2
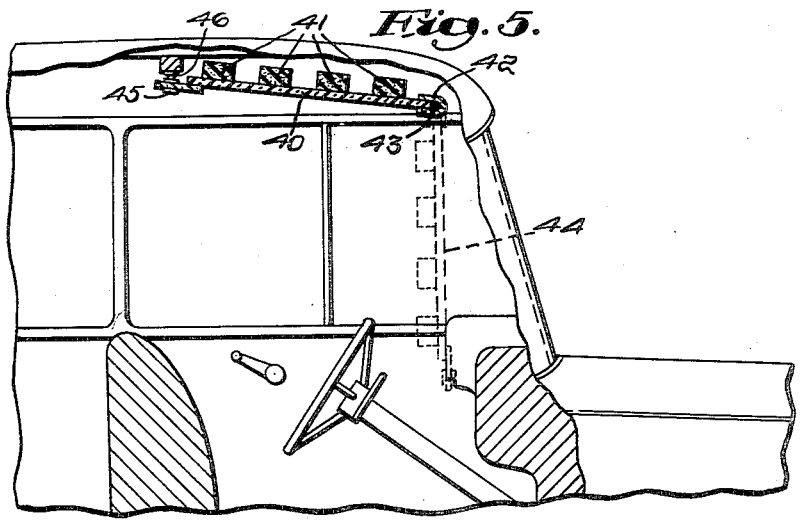
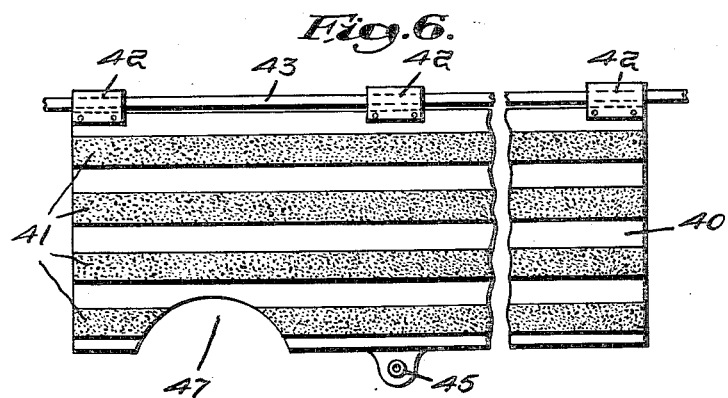
Inventor:
Benjamin I. Cassin,
by Arthur D. Thomson
Attorney United States Patent Office 2,854,281
Patented Sept. 30, 1958

2,854,281

SAFETY SHIELD FOR AUTOMOBILES

Benjamin I. Cassin, Chelsea, Mass.

Application November 14, 1955, Serial No. 546,654

2 Claims. (Cl. 296—84)

This invention relates to safety devices for automobiles, and more particularly to devices for protecting the occupants of the front seat from being thrown through or against the windshield in case of collision.

In automobile accidents of the head-on collision type, the driver and passengers in the front seat are likely to be thrown violently against the windshield. Many fatalities and serious injuries, particularly head injuries, occur in this manner. The danger of cuts from broken glass is also serious, although of secondary importance as compared to the effects of impact. The use of non-shatterable glass for the windshield does not entirely eliminate the danger of lacerations, and increases rather than mitigates the danger of violent impact. Various types of curtains which have been previously devised for shielding occupants of a car from flying glass are generally ineffective for cushioning the impact of the occupants' heads with the windshield. Furthermore, such curtains, if drawn in time to serve their purpose, obstruct the driver's vision so that he cannot control the car at a critical moment.

The object of this invention is to provide a shield which not only protects the occupants of an automobile from broken glass but effectively cushions their impact with the windshield or the dash-board in the event of a head-on collision, which can be drawn into position quickly, when a collision appears imminent, and which, when drawn, does not seriously obstruct the driver's vision so that he can continue to maneuver the car.

In one form, the shield consists generally of a number of horizontal strips of rigid, transparent material connected together by flexible strips of cushioning material, and is mounted on tracks so as to slide from a position against the roof of the car to a position in front of the windshield. In another form, the shield is made of a piece of rigid transparent material on which spaced strips of cushioning material are mounted, and is hinged to swing up against the car roof or down in front of the windshield. Other novel features of the device will be apparent from the following detailed description.

In the drawings illustrating the invention:

Fig. 1 is a vertical cross-section of the shield device as installed in an automobile, shown in stored position;

Fig. 2 is a section similar to Fig. 1 with the shield shown in operative position;

Fig. 3 is a rear elevation of the shield in operative position;

Fig. 4 is an enlarged fragmentary vertical section of the shield;

Fig. 5 is a vertical cross-section of a modified form of shield as installed in an automobile; and Fig. 6 is a rear elevation of the shield of Fig. 5.

In the shield of the form shown in Figs. 1–4, a number of relatively rigid, transparent slats 20, preferably made of unbreakable plastic material, such as methyl methacrylate, are joined together by flexible strips 21, which may be made of rubber or similar material. The slats 20 have flanges 20a and 20b all along their upper and lower edges, and strips 21 are connected to these flanges by rivets 22 or other suitable fastening. Attached to the strips 21, between the slats, are a number of cushioning strips 23 made of a highly resilient and compressible material, such as foam rubber. The strips project some distance beyond the rear faces of the slats.

As seen in Fig. 3, strips 23 stop short of the ends of the slats, leaving end portions 20c and 20d exposed. The latter are slidably received in a pair of channel-shaped tracks 24 and 25 which are mounted in the car to either side of the windshield. These tracks have vertical portions disposed alongside the windshield and curve over at the top to follow the contour of the car roof. A pair of tension springs 26 and 27 are mounted in the lower parts of the tracks and are connected to the bottom corners of the curtain.

To hold the shield in its stored position, as shown in Fig. 1, a latching mechanism is provided, and consists of a hook-shaped latch arm rotatably mounted on a bracket 29 attached to the roof of the car, a second hook-shaped latch arm 31 attached to the shield, and a tension spring 30 which holds the two latch arms engaged. A pull cord or handle 32 is attached to latch arm 31 so that the latter may be manually released from arm 28. For remote control, a solenoid 33 is mounted above arm 28 and, when energized, draws the latter up out of engagement with arm 31. The solenoid is powered by the electrical system of the car and is wired to a suitable push button or switch mounted in any convenient location. For example, the control switch for the solenoid may be mounted on the steering wheel so that the driver may operate the shield without taking his hands off the wheel.

When the latch mechanism is released, springs 26 and 27 quickly pull the shield down to the position shown in Fig. 2. A pair of stops 34 and 35 may be provided on the track for limiting the downward travel of the shield.

As here illustrated, the shield, in operative position, covers the dash and instrument panel as well as the windshield. This arrangement is preferable from the standpoint of safety, as the various knobs and dials ordinarily found on the instrument panel have caused severe injuries in accidents. If space is limited, however, the shield may be made to cover only the windshield.

In the form shown in Figs. 5 and 6, a sheet 40, of transparent material, forms the body of the shield, and a number of strips 41, of cushioning material, are mounted horizontally and spaced apart on the side of the sheet which faces the rear of the car when the shield is installed. Along the upper edge of the sheet 40 are mounted a number of hinge straps 42. The shield is mounted in the automobile by means of a rod 43 which passes through the hinge straps. As shown in Fig. 5, the shield is normally stored in a position against the roof of the car, and can be swung down, when needed, to the position shown by the dotted outline 44.

The shield is preferably provided with a handle tab 45 carrying one member of a separable snap fastener 46 which engages a snap member mounted on the roof of the car. A cut-out 47 may also be provided, if necessary, so that the shield will clear the steering wheel when swung down. This type of shield will not interfere with the use of ordinary sun visors hinged to the roof in front of rod 43, as the visor can be swung down along with the shield.

Either form of shield can be brought into operative position very quickly by the driver or by a passenger in the front seat. When the shield is in place the transparent portions afford ample vision for the driver. These slats 20, or the sheet 40, are preferably made of a plastic material which is fairly rigid, but yet will bend under the forward momentum of a body striking it, in the event of an accident, thus providing a gradual deceleration rather than a sudden impact. This action helps to minimize the danger of brain concussions, while the spronge rubber strips cushion the occupants' heads. The shield can nevertheless be made sufficiently strong to stop the forward motion of the occupants of the car before they strike the windshield and prevent their being thrown through the latter if it should break.

What is claimed is:

1. A safety device for automobiles comprising a pair of tracks mounted on the sides of the automobile and having generally upright portions disposed to either side of the windshield and portions extending to the rear along the roof, a shield comprising a number of horizontal, relatively rigid transparent slats alternating with and connected to a number of flexible strips of resilient compressible material all said strips having portions projecting toward the rear of the automobile beyond said slats, said slats having ends slidably received in said tracks, a pair of springs connected to said shield and tending to draw the shield down into the upright portions of the track, a latching device for engaging the shield to hold it in an overhead position on the rearwardly extending portions of the track, and means operable by occupants of the automobile to release the shield from said latching device.

2. A safety device, for an automobile having a windshield and a front seat, comprising a shield composed of a number of slats of relatively stiff transparent material alternating with and connected to a number of strips of flexible material, and strips of compressible resilient material mounted on said strips of flexible material, and means for mounting the shield in the automobile to permit movement of the shield from an overhead position to a position between the windshield and the front seat, all said strips of resilient material projecting beyond said slats toward said front seat when the shield is in the latter position.

References Cited in the file of this patent

UNITED STATES PATENTS

| 1,554,474 | Walker | Sept. 22, 1925 |
| 2,050,141 | Wethington | Aug. 4, 1936 |
| 2,237,700 | Goldman | Apr. 8, 1941 |
| 2,592,573 | Joncas | Apr. 15, 1952 |
| 2,606,755 | Samuels | Aug. 12, 1952 |
| 2,715,042 | Lancaster | Aug. 9, 1955 |
| 2,747,926 | Ralls | May 29, 1956 |

FOREIGN PATENTS

| 870,071 | Germany | Mar. 9, 1953 |
| 7,088 | Great Britain | of 1908 |